(12) United States Patent
Tsukamoto

(10) Patent No.: US 8,939,623 B2
(45) Date of Patent: Jan. 27, 2015

(54) OPTICAL SYSTEM UNIT AND VEHICULAR LAMP

(71) Applicant: Koito Manufacturing Co., Ltd., Tokyo (JP)

(72) Inventor: Michio Tsukamoto, Shizuoka (JP)

(73) Assignee: Koito Manufacturing Co., Ltd. (JP)

( * ) Notice: Subject to any disclaimer, the term of this patent is extended or adjusted under 35 U.S.C. 154(b) by 0 days.

(21) Appl. No.: 13/917,819

(22) Filed: Jun. 14, 2013

(65) Prior Publication Data

US 2013/0343074 A1   Dec. 26, 2013

(30) Foreign Application Priority Data

Jun. 25, 2012 (JP) ................. 2012-141737

(51) Int. Cl.
  *F21V 13/04* (2006.01)
  *F21S 8/10* (2006.01)
  *B60Q 1/00* (2006.01)

(52) U.S. Cl.
  CPC ............. *F21V 13/04* (2013.01); *F21S 48/1159* (2013.01); *B60Q 1/0047* (2013.01); *F21S 48/1388* (2013.01); *F21S 48/14* (2013.01); *F21S 48/215* (2013.01); *F21S 48/2237* (2013.01); *F21S 48/2268* (2013.01); *F21S 48/2287* (2013.01)
  USPC ........... 362/511; 362/507; 362/514; 362/516; 362/538; 362/545

(58) Field of Classification Search
  CPC . F21S 48/1241; F21S 48/215; F21S 48/2268; F21S 48/145; F21S 48/1757; F21S 48/1388; F21S 48/115; F21S 48/1154; B60Q 1/0683
  USPC ................. 362/511, 507, 514, 516, 538, 545
  See application file for complete search history.

(56) References Cited

U.S. PATENT DOCUMENTS

| | | | | |
|---|---|---|---|---|
| 3,869,904 | A * | 3/1975 | Gabor | 73/605 |
| 7,156,544 | B2 * | 1/2007 | Ishida | 362/538 |
| 7,575,352 | B2 * | 8/2009 | Sato et al. | 362/514 |
| 7,946,743 | B2 * | 5/2011 | Natsume et al. | 362/516 |
| 8,485,704 | B2 * | 7/2013 | Koizumi et al. | 362/511 |
| 2004/0218858 | A1 * | 11/2004 | Guy | 385/33 |

FOREIGN PATENT DOCUMENTS

JP    2010267468    11/2010

* cited by examiner

*Primary Examiner* — Jong-Suk Lee
*Assistant Examiner* — Mark Tsidulko
(74) *Attorney, Agent, or Firm* — Cantor Colburn LLP

(57) ABSTRACT

Disclosed is a projection lens that is disposed in front of a first semiconductor light emitting device and configured to irradiate light incident from the rear side to the front side. A first reflector reflects a part of the light emitted from the first semiconductor light emitting device to converge on the rear side of the projection lens. A light guide member is disposed across the front side of the projection lens and configured to emit the light incident from the second semiconductor light emitting device to a predetermined direction. A second reflector reflects a part of the light reflected by the first reflector toward the projection lens. The light reflected by the second reflector to be incident on the projection lens is emitted from the projection to avoid the light guide member.

9 Claims, 4 Drawing Sheets

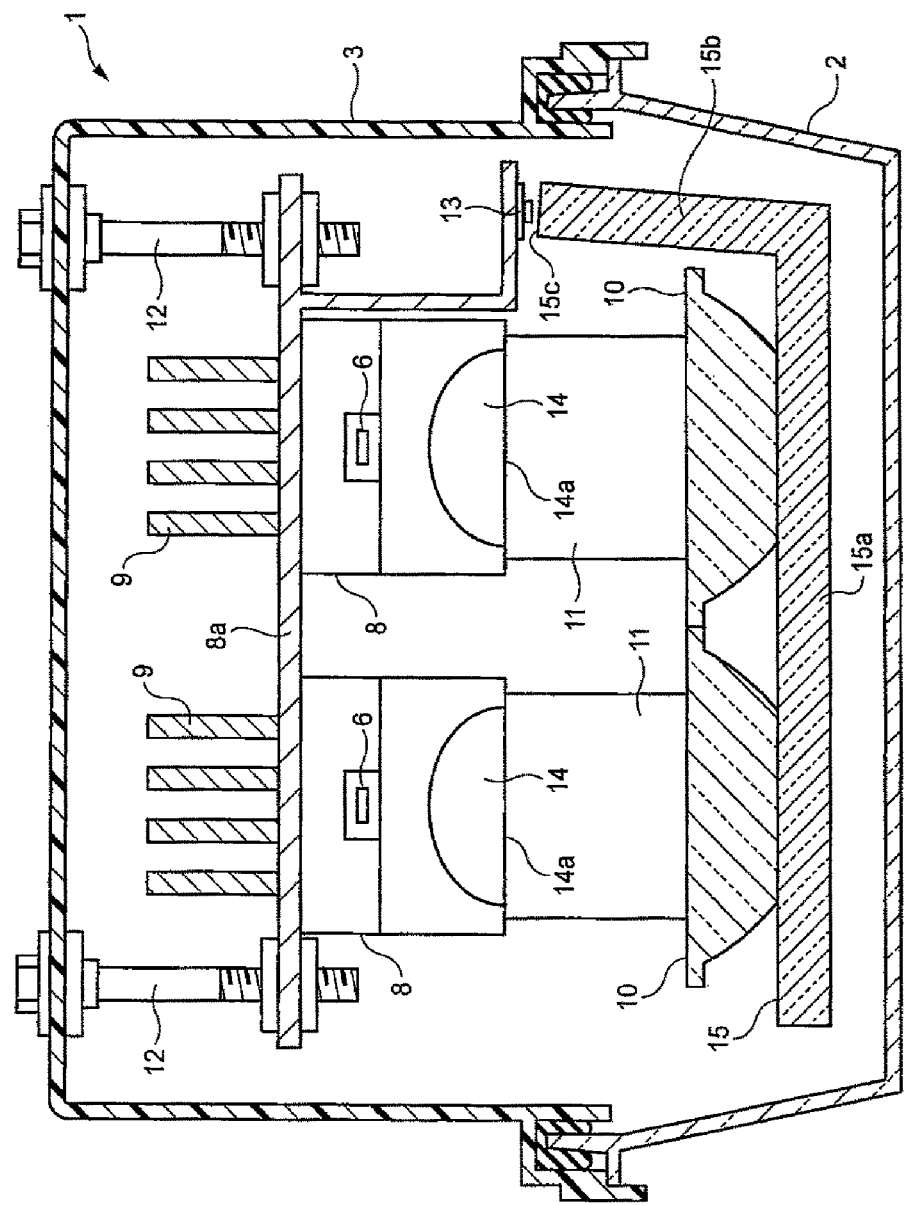

OPTICAL SYSTEM UNIT AND VEHICULAR LAMP

CROSS-REFERENCE TO RELATED APPLICATIONS

This application is based on and claims priority from Japanese Patent Application No. 2012-141737, filed on Jun. 25, 2012, with the Japan Patent Office, the disclosure of which is incorporated herein in its entirety by reference.

TECHNICAL FIELD

The present disclosure relates to a lamp mounted to a vehicle, and to an optical system unit that is accommodated in a lamp chamber of the lamp mounted to a vehicle.

BACKGROUND

As a lamp of this type, one has been known in which a plurality of optical system units used in different purposes are accommodated in a lamp chamber. For example, Japanese Patent Laid-Open Publication No. 2010-267468 discloses a lamp for a vehicle in which a first optical system unit constituting a head light configured to illuminate a predetermined area in front of the vehicle and a second optical system unit constituting a daytime running light used to notify the presence of the vehicle to other vehicles or pedestrians in front of vehicle are accommodated in a lamp chamber.

SUMMARY

Recently, a demand for miniaturization of a vehicular lamp has increased. When two optical system units are arranged in a vertical direction as described in Japanese Patent Laid-Open Publication No. 2010-267468, it is difficult to meet the demand.

Accordingly, the present disclosure has been made in an effort to provide a technology which enables the miniaturization of a lamp which accommodates a plurality of optical system units used in different purposes in a lamp chamber.

A first aspect of the present disclosure provides an optical system unit accommodated in a lamp chamber of a lamp for a vehicle. The optical system unit includes: a first semiconductor light emitting device; a projection lens disposed in front of the first semiconductor light emitting device and configured to irradiate light incident from the rear side to the front side; a first reflector configured to reflect a part of the light emitted from the first semiconductor light emitting device to converge on the rear side of the projection lens; a second semiconductor light emitting device; a light guide member disposed across the front side of the projection lens and configured to emit the light incident from the second semiconductor light emitting device to a predetermined direction; and a second reflector configured to reflect a part of the light reflected by the first reflector toward the projection lens. The light reflected by the second reflector to be incident on the projection lens is emitted from the projection lens to avoid the light guide member.

A second aspect of the present disclosure provides a lamp for a vehicle including: a housing; a light-transmitting cover mounted in the housing and configured to define a lamp chamber; a first semiconductor light emitting device disposed within the lamp chamber; a projection lens disposed in front of the first semiconductor light emitting device and configured to irradiate incident light to the front side through the light-transmitting cover; a first reflector disposed within the lamp chamber and configured to reflect a part of the light emitted from the first semiconductor light emitting device to converge on the rear side of the projection lens; a second semiconductor light emitting device disposed within the lamp chamber; a light guide member disposed across the front side of the projection lens within the lamp chamber and configured to emit the light incident from the second semiconductor light emitting device to a predetermined direction; and a second reflector disposed within the lamp chamber and configured to reflect a part of the light reflected at the first reflector toward the projection lens. The light reflected by the second reflector to be incident on the projection lens is emitted from the projection to avoid the light guide member.

According to the configuration, since the light guide member used for purposes other than illuminating the front side of a vehicle is disposed across the projection lens, the size of the lamp in the vertical direction of the vehicle may be greatly reduced as compared to the configuration where a plurality of optical system units used for different purposes are disposed in the vertical direction of the vehicle. Further, since the light reflected by the second reflector to be incident on the projection lens is emitted from the projection lens to avoid the light guide member, the light guide member disposed across the front side of the projection lens does not disturb the illumination by the light emitted from the first semiconductor light emitting device. Accordingly, it may be compatible to miniaturize the lamp and to maintain the light utilization efficiency of the light source.

An end edge of the second reflector may form a part of an end edge of a light distribution pattern which is formed when the light reflected by the first reflector passes through the projection lens.

According to the configuration, the second reflector may also serve as a shade for forming a light distribution pattern in front of the vehicle. As a result, the number of the components may be reduced to contribute to the miniaturization and the lightening of the lamp. Further, the light blocked to define a non-irradiation area of the light distribution pattern is reflected toward the projection lens by the reflecting surface of the second reflector. As a result, the light emitted from the first semiconductor light emitting device may be used as much as possible to increase the intensity of illumination of the light distribution pattern.

At least a part of the light guide member may be disposed within the recess formed in the projection lens. In that case, the size of the lamp in the forward and rearward direction of the vehicle may be reduced.

The light guide member may be configured as a transparent member configured to emit light to a predetermined direction using an internal reflection. In that case, the incompatibility that occurs in the appearance of the projection lens when the light guide member does not illuminate may be suppressed. Meanwhile, a fresh and attractive appearance may be provided when illuminating.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 is a transverse cross-sectional view taken along line III-III in FIG. 1.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The present disclosure will be described in detail with reference to the accompanying drawings. Further, in respective drawings referred to in the descriptions below, each component is illustrated in a scale which is appropriately changed to be recognized.

Figure 1:
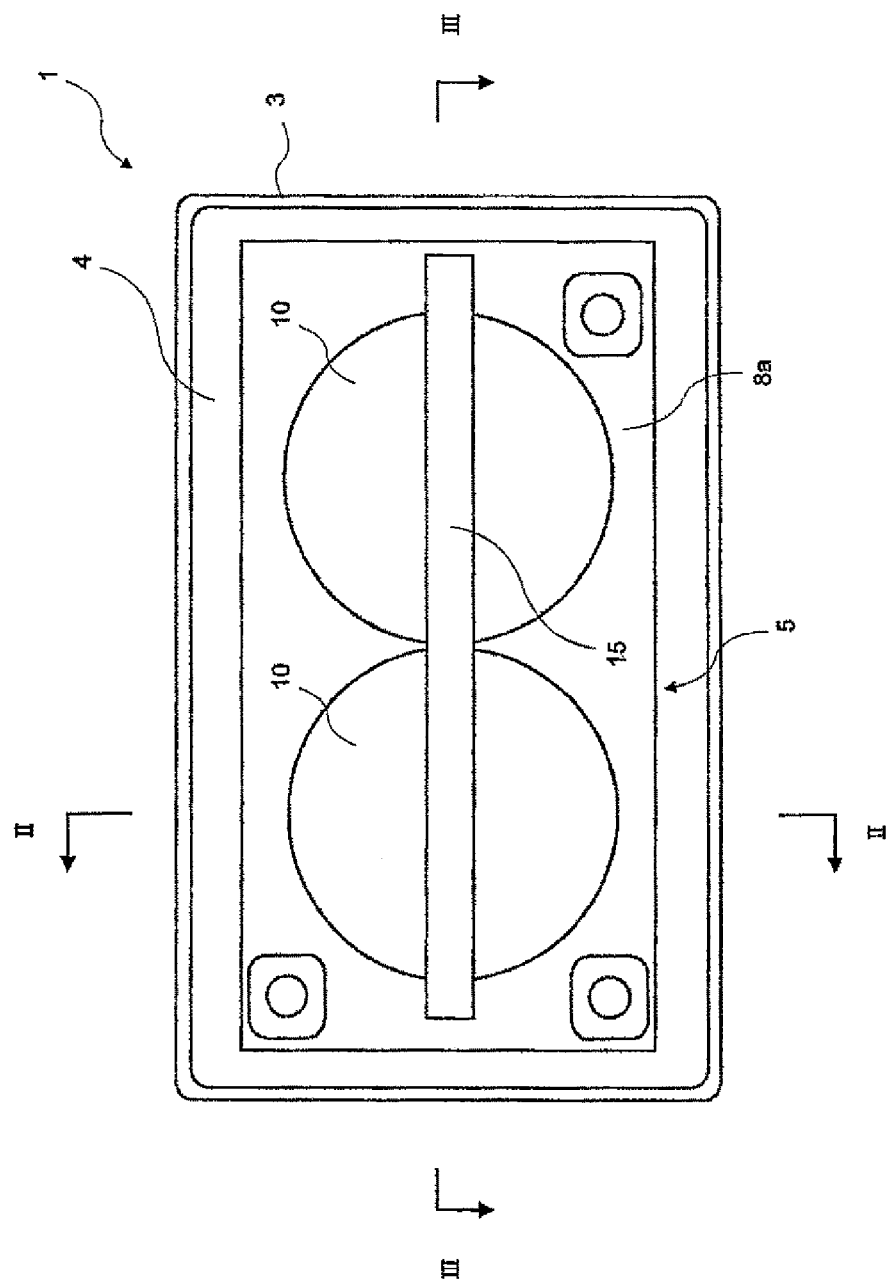
FIG. 1 is a schematic front view of a configuration of a vehicular lamp according to a first exemplary embodiment of the present disclosure.
Figure 2:
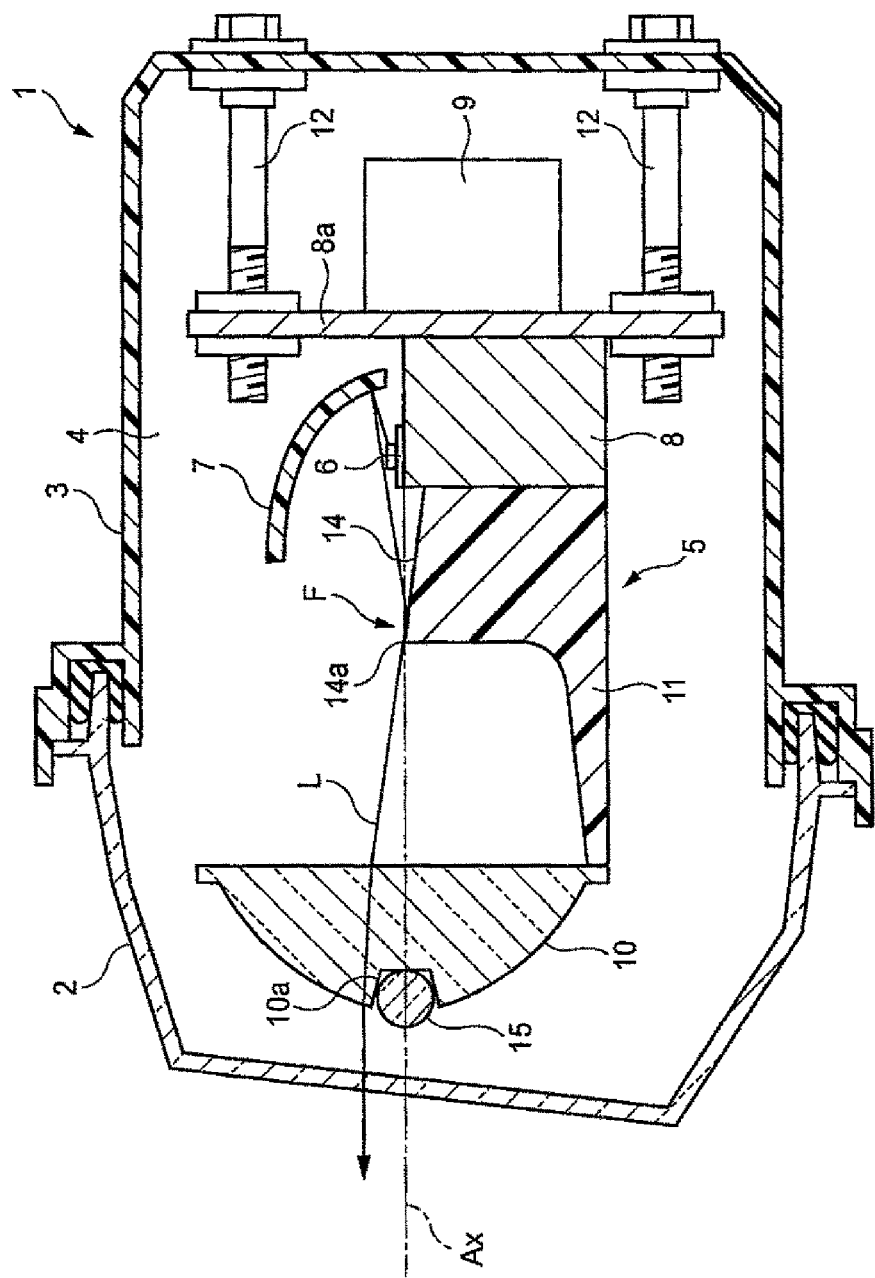
FIG. 2 is a longitudinal cross-sectional view taken along line II-II in FIG. 1.

FIG. 1 is a schematic front view of a head lamp 1 according to a first exemplary embodiment of the present disclosure. FIG. 2 is a longitudinal cross-sectional view where the internal configuration of the head lamp 1 is schematically illustrated taken along line II-II in FIG. 1. FIG. 3 is a transverse cross-sectional view where the internal configuration of the head lamp 1 is schematically illustrated taken along line III-III in FIG. 1.

The head lamp 1 as a vehicular lamp of the present disclosure is a lamp mounted in the front portion of a vehicle to illuminate the front side of the vehicle. As illustrated in FIGS. 1 to 3, the head lamp 1 includes a lamp chamber 4 that is defined by mounting a light-transmitting cover 2 in the front portion of a lamp housing 3 as a housing of the present disclosure. In FIG. 1, the light-transmitting cover 2 is not illustrated.

An optical system unit 5 is accommodated in the lamp chamber 4. The optical system unit 5 includes: a first LED 6, a first reflector 7, a base member 8, a heat sink 9, a projection lens 10, a lens holder 11, posture control mechanisms 12, a second LED 13, a second reflector 14, and a light guide member 15.

The optical system unit 5 projects the light emitted from the first LED 6 toward the front side of the vehicle through the projection lens 10. As illustrated in FIGS. 1 and 3, two first LEDs 6 and two projection lenses 10 are arranged side by side in the widthwise direction of the vehicle within the lamp chamber 4, thereby forming two optical systems which are separated from each other. Reference numeral Ax in FIG. 2 represents an optical axis of one of the optical system.

The base member 8 is made of a material such as, for example, a metal having a high thermal conductivity, and supports the first LED 6 on the top surface thereof. The lens holder 11 extends toward the front side from the front surface of the base member 8, and the projection lens 10 is supported at the front end portion of the lens holder 11.

A flange 8a is formed in the rear side portion of the base member 8, and the heat sink 9 is provided in the rear side of the flange 8a. The heat sink 9 is configured in a shape and an arrangement which are appropriate to efficiently dissipate the heat generated from the first LED 6.

The optical system unit 5 is fixed to the lamp housing 3 via the posture control mechanisms 12. Each of the posture control mechanisms 12 includes a bolt member and a nut member, and the rear end portion of the bolt member is stopped and fixed to the lamp housing 3. The front end portion of the bolt member is fixed to the flange 8a of the base member 8 through the nut member. In each of the posture control mechanisms 12 installed in a plurality of locations, the screwing position of the nut member against the bolt member may be controlled, and thus, the posture of the optical system unit 5 within the lamp chamber 4 may be controlled.

The first LED 6 as the first semiconductor light emitting device of the present disclosure is mounted on a circuit board and emits light in accordance with a control signal input from a vehicle side control unit through a signal line (not illustrated).

The first reflector 7 includes a reflecting surface having a substantially spherical ellipse shape where the optical axis Ax is the central axis thereof. The first LED 6 is disposed in a first focal point of the ellipse that constitutes a vertical cross-section of the reflecting surface, and configured such that the light emitted from the first LED 6 converges on a second focal point F of the ellipse.

The projection lens 10 is a plano-convex type aspheric lens where the front side surface is a convex surface and the rear side surface is a plane, and disposed on the optical axis Ax in front of the first LED 6. The projection lens 10 is disposed such that the rear focal point coincides with the second focal point F of the reflecting surface of the first reflector 7.

Accordingly, the first reflector 7 reflects a part of the light emitted from the first LED 6 to make the reflected light converge on the rear side of the projection lens 10. The projection lens 10 irradiates the light incident from the rear side of the projection lens 10 to the front side of the projection lens 10 and projects an image of the rear focal point on a vertical virtual screen in front of the vehicle as a reversed image.

The light guide member 15 is a transparent member made of a resin such as, for example, polymethylmethacrylate and polycarbonate. As illustrated in FIG. 3, the light guide member 15 includes a first part 15a that extends in the widthwise direction of the vehicle and a second part 15b that extends in the longitudinal direction of the vehicle. The first part 15a of the light guide member 15 is disposed across the front side of the projection lens 10 on the optical axis Ax, and accommodated within a recess 10a formed in the front surface of the projection lens 10 as illustrated in FIG. 2.

The second LED 13 as a second semiconductor light emitting device of the present disclosure is disposed at a location which is opposite to an end surface 15c of the rear end of the second part 15b of the light guide member 15 as illustrated in FIG. 3.

The light guide member 15 has a known configuration that emits the incident light to a predetermined direction using an internal reflection. The light emitted from the second LED 13 is incident on the end surface 15c of the light guide member 15 and internally reflected to be emitted to the outside of the vehicle. Since the emitted light is visible through the light-transmitting cover 2, it looks as if the light guide member 15 entirely emits light. The light guide member 15 that emits light is used as a light source of a clearance light or a daytime running light.

A portion of the top surface of the lens holder 11 forms the second reflector 14 that reflects a part of the light reflected by the first reflector 7 toward the projection lens 10. The front end portion 14a of the reflecting surface of the second reflector 14 is disposed slightly ahead of the second focal point F of the reflecting surface of the first reflector 7. The reflecting surface of the second reflector 14 is further inclined to be spaced apart from the optical axis Ax downward as the reflecting surface extends from the front end portion 14a toward the rear side. Accordingly, light L reflected by the second reflector 14 to be incident on the projection lens 10 is emitted from the projection lens 10 to avoid the light guide member 15.

Since the front end portion 14a of the second reflector 14 is disposed slightly ahead of the second focal point F of the first reflector 7, a part of the light emitted from the first LED 6 and reflected by the first reflector 7 is blocked by the front end portion 14a. As a result, a low-beam light distribution pattern denoted by reference numeral PL in FIG. 4B is formed on the virtual vertical screen disposed in front of the vehicle. The low-beam light distribution pattern is to illuminate for a short distance in front of the vehicle.

Figure 4A:
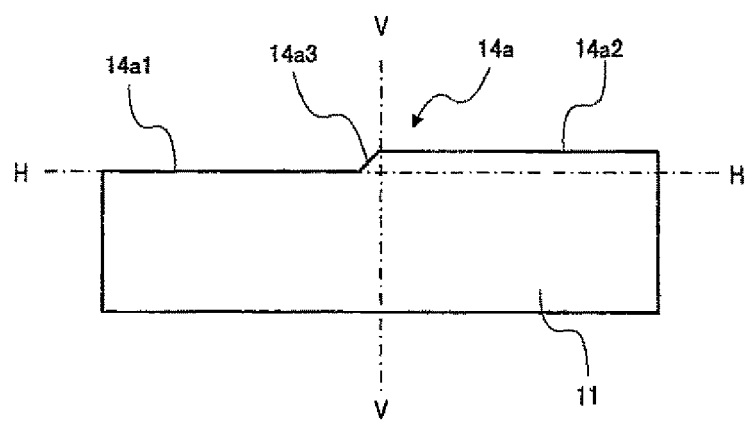
FIGS. 4A and 4B are views illustrating a shape of the front end portion of a second reflector included in the vehicular lamp in FIG. 1, and a light distribution pattern formed in accordance with the shape, respectively.
Figure 4B:
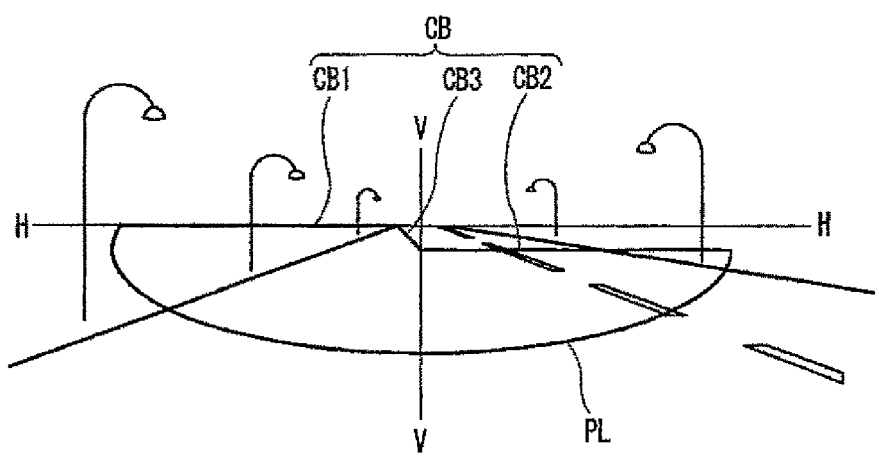

FIG. 4A is a schematic front view illustrating the appearance of the front end portion 14a of the second reflector 14 when viewed from the front side. The front end portion 14a includes: a first horizontal top end edge 14a1, a second horizontal top end edge 14a2, and an inclined top end edge 14a3. The first horizontal top end edge 14a1 extends along the horizontal line H-H in the right side of the widthwise direction of the vehicle with respect to the vertical line V-V (in the left side in FIG. 4A). The second horizontal top end edge 14a2 extends horizontally slightly above the horizontal line H-H, in the left side of the widthwise direction of the vehicle with respect to the vertical line V-V (in right side in FIG. 4A). The inclined top end edge 14a3 extends in an inclined state to connect the first horizontal top-end edge 14a1 and the second horizontal top end edge 14a2. The inclined angle of the inclined top end edge 14a3 is, for example, 45°.

The low-beam light distribution pattern PL is a left light distribution pattern (which is used in a region where a vehicle should run in a left lane), and includes a first cut-off line CB1, a second cut-off line CB2, and a third cut-off line CB3 at the top end edge of the low-beam light distribution pattern PL. The first cut-off line CB1 and the second cut-off line CB2 extend in the horizontal direction with a great difference between the left and right sides with reference to the vertical line V-V. In the description below, the first to third cut-off lines CB1 to CB3 will be collectively referred to as "a cut-off line CB" as needed.

The first cut-off line CB1 is formed by the first horizontal top end edge 14a1 of the second reflector 14 to extend along the horizontal line H-H, and used for a cut-off line of the lane side of the vehicle. The second cut-off line CB2 is formed by the second horizontal top end edge 14a2 of the second reflector 14 to extend horizontally slightly below the horizontal line H-H, and used as a cut-off line of the opposite lane side. The third cut-off line CB3 is formed by the inclined top end edge 14a3 of the second reflector 14 to extend to be inclined from the right end of the first cut-off line CB1 toward a right and down direction to be connected to the left end of the second cut-off line CB2.

That is, the first horizontal top end edge 14a1, the second horizontal top end edge 14a2, and the inclined top end edge 14a3 as the end edge of the second reflector 14 form the cut-off line CB which is a part of an end edge of the low-beam light distribution pattern PL formed as the light reflected by the first reflector 7 passes through the projection lens 10.

As described above, according to the configuration of the present exemplary embodiment, the light guide member 15 such as, for example, a clearance light or a daytime running light that is used for a purpose other than illuminating a predetermined region in front of the vehicle is disposed across the projection lens 10. As a result, the size of the head lamp 1 in the vertical direction of the vehicle may be greatly reduced, as compared to a configuration where a plurality of optical system units used for different purposes are disposed in the vertical direction of the vehicle.

Further, since a part of the light guide member 15 is disposed within the recess 10a formed on the front surface of the projection lens 10, the size of the head lamp 1 in the longitudinal direction of the vehicle may be reduced.

Further, since the second reflector 14 and the projection lens 10 are configured such that the light reflected by the second reflector 14 and incident to the projection lens 10 is emitted from the projection lens 10 to avoid the light guide member 15, the light guide member 15 disposed across the front side of the projection lens 10 does not disturb the illumination by the light emitted from the first LED 6. Therefore, it may be compatible to miniaturize the head lamp 1 and to maintain the light utilization effect of the light source.

Further, as described with reference to FIGS. 4A and 4B, the second reflector 14 also serves as a shade for forming a low-beam light distribution pattern PL in front of the vehicle. As a result, the number of the components may be reduced to contribute to the miniaturization and the lightening of the head lamp 1. Further, the light blocked to define a non-irradiation area of the low-beam light distribution pattern PL is reflected toward the projection lens 10 by the reflecting surface of the second reflector 14. As a result, the light emitted from the first LED 6 may be used as much as possible to increase the intensity of illumination of the low-beam light distribution pattern PL.

Further, the light guide member 15 disposed across the front side of the projection lens 10 is configured by a transparent member that emits the incident light toward a predetermined direction using the internal reflection. Therefore, a sense of incompatibility occurring in the appearance of the projection lens 10 when the light guide member 15 does not emit light may be suppressed. Meanwhile, a fresh and attractive appearance may be provided when emitting light.

The above-described exemplary embodiment is provided for helping the easy understanding of the present disclosure and is not intended to limit the present disclosure. It is evident that the present disclosure may be changed or modified without departing from the gist thereof, and the present disclosure includes the equivalents thereof.

The semiconductor light emitting device used as a light source is not limited to the LED. A laser diode or an organic EL light emitting device may be used.

It is not always necessary for the light guide member 15 to be disposed across the front side of the projection lens 10 on the light axis Ax. A proper number of light guide members 15 may be provided at an appropriate location and disposed across the front side of the projection lens 10 in accordance with a request in the specifications of a vehicle in which the guide members 15 are provided. In that case, it may be required to properly adjust the shapes and the arrangements of the second reflector 14 and the projection lens 10 such that the light reflected at the second reflector 14 to be incident to the projection lens 10 is emitted from the projection lens 10 to avoid the light guide members 15.

The light guide member 15 may be configured to be disposed as a whole within the recess 10a formed on the front surface of the projection lens 10.

It is not always necessary for the light guide member 15 to use a transparent member that uses an internal reflection. A reflector having a reflecting surface with an appropriate shape may be used, as long as the light emitted from the second LED 13 may be emitted toward a predetermined direction.

It is not always necessary for the first LED 6, the first reflector 7, the projection lens 10, the second LED 13, the second reflector 14, and the light guide member 15 to form an integral component as the optical system unit 5. These components may be configured to be disposed separately within the lamp chamber 4, as long as the first reflector 7 reflects a part of the light emitted from the first LED 6 to converge on the rear side of the projection lens 10, the projection lens 10 is disposed in front of the first LED 6 and irradiates the incident light to the front side thereof through the light-transmitting cover 2, the light guide member 15 is disposed across the front side of the projection lens 10 and emits the light incident from the second LED 13 toward a predetermined direction, the second reflector 14 reflects some of the light reflected at the first reflector 7 toward the projection lens 10, and the light reflected at the second reflector 14 to be incident to the projection lens 10 is emitted from the projection lens 10 to avoid the light guide member 15.

The first LED 6 is not limited to the purpose of forming the low-beam light distribution pattern PL, and may be used as a light source for various purposes in which the first LED 16 is not always turned ON when the light guide member 15 emits light. In that case, it is not always necessary for the second reflector 14 d be used as a shade for forming a low-beam light distribution pattern.

The vehicular lamp of the present disclosure is not limited to the use of the head lamp 1. That is, the "front side" to which the projection lens 10 irradiates light is not limited to the front side of the vehicle. The present disclosure may apply to every vehicular lamp including a projection lens 10 which is used to form a predetermined light distribution pattern by irradiating light to its front side.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An optical system unit accommodated in a lamp chamber of a lamp for a vehicle, comprising:
   a first semiconductor light emitting device;
   a projection lens disposed in front of the first semiconductor light emitting device and configured to irradiate light incident from the rear side to the front side of the vehicle;
   a first reflector configured to reflect a part of the light emitted from the first semiconductor light emitting device to converge on the rear side of the projection lens;
   a second semiconductor light emitting device;
   a light guide member disposed across the front side of the projection lens and configured to emit the light incident from the second semiconductor light emitting device to a predetermined direction with an internal reflection so as not to disturb the light emitted from the first semiconductor light emitting device; and
   a second reflector configured to reflect a part of the light reflected by the first reflector toward the projection lens such that the reflected light by the second reflector is incident into the projection lens while avoiding the light guide member,
   wherein the light emitted from the first semiconductor light emitting device to be incident on the projection lens through the first reflector and the second reflector is emitted from the projection lens to the front side avoiding the light guide member.

2. The optical system unit of claim 1, wherein an end edge of the second reflector forms a part of an end edge of a light distribution pattern which is formed when the light reflected by the first reflector passes through the projection lens.

3. The optical system unit of claim 2, wherein at least a part of the light guide member is disposed within a recess formed on the projection lens.

4. The optical system unit of claim 3, wherein the light guide member is a transparent member configured to emit light to the predetermined direction using an internal reflection.

5. The optical system unit of claim 2, wherein the light guide member is a transparent member configured to emit light to the predetermined direction using an internal reflection.

6. The optical system unit of claim 1, wherein at least a part of the light guide member is disposed within a recess formed on the projection lens.

7. The optical system unit of claim 6, wherein the light guide member is a transparent member configured to emit light to the predetermined direction using an internal reflection.

8. The optical system unit of claim 1, wherein the light guide member is a transparent member configured to emit light to the predetermined direction using an internal reflection.

9. A vehicular lamp comprising:
   a housing;
   a light-transmitting cover mounted in the housing and configured to define a lamp chamber;
   a first semiconductor light emitting device disposed within the lamp chamber;
   a projection lens disposed in front of the first semiconductor light emitting device and configured to irradiate the incident light to the front side through the light-transmitting cover;
   a first reflector disposed within the lamp chamber and configured to reflect a part of the light emitted from the first semiconductor light emitting device to converge on the rear side of the projection lens;
   a second semiconductor light emitting device disposed within the lamp chamber;
   a light guide member disposed across the front side of the projection lens within the lamp chamber and configured to emit the light incident from the second semiconductor light emitting device to a predetermined direction with an internal reflection so as not to disturb the light emitted from the first semiconductor light emitting device; and
   a second reflector disposed within the lamp chamber and configured to reflect a part of the light reflected by the first reflector toward the projection lens such that the reflected light by the second reflector is incident into the projection lens while avoiding the light guide member,
   wherein the light emitted from the first semiconductor light emitting device to be incident on the projection lens through the first reflector and the second reflector is emitted from the projection lens to the front side avoiding the light guide member.

* * * * *